Figure 1:
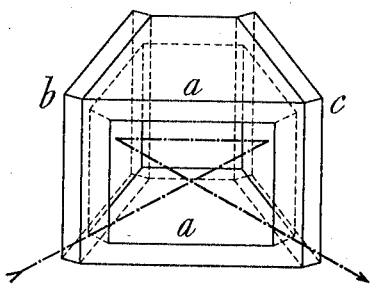
Figure 2:
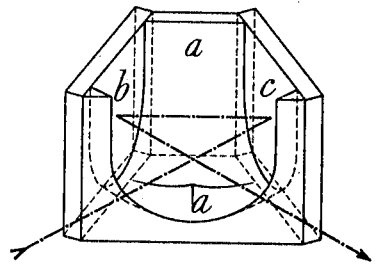

O. EPPENSTEIN.
OPTICAL SQUARE.
APPLICATION FILED JULY 17, 1913.

1,105,895.

Patented Aug. 4, 1914.

Witnesses:
Paul Krüger
Fritz Sander

Inventor:
Otto Eppenstein

UNITED STATES PATENT OFFICE.

OTTO EPPENSTEIN, OF JENA, GERMANY, ASSIGNOR TO THE FIRM OF CARL ZEISS, OF JENA, GERMANY.

OPTICAL SQUARE.

1,105,895.   Specification of Letters Patent.   Patented Aug. 4, 1914.

Application filed July 17, 1913. Serial No. 779,487.

*To all whom it may concern:*

Be it known that I, OTTO EPPENSTEIN, a citizen of the German Empire, residing at Jena, Germany, have invented a new and useful Optical Square, of which the following is a specification.

Through patent specification 995235 means have become known, for lessening in optical squares consisting of two silvered glass plates fixed to an intermediate member those changes of form, which are caused by considerable differences of the mean temperature of the intermediate member on the one hand and of the plates on the other hand. The means there given consist in choosing for the intermediate member a material, which has approximately the same thermal conductivity as the glass plates. The patent specification 995235 specially suggests making the intermediate member also of glass, and makes this constructional form the subject of the second claim. As experience has shown, however, even those optical squares, in which glass serves as the material both for the reflecting plates and for the intermediate member, do not, under specially severe conditions, remain sufficiently free from changes of form. The cause of this is probably to be sought for in strains in the glass, which cannot be entirely equalized. The patent specification 995235 had believed it necessary to retain glass as the material for the reflecting plates, so that these might be silvered on their rear side and at the same time serve as a protection for the silvering. In consequence of such an arrangement it became necessary to make the thermal conductivity of the intermediate member conformable to that of the reflecting plates and to choose glass as the material for the intermediate member as well, if the reflecting plates and the intermediate member were to consist of the same material.

The present invention has started from the knowledge, that the advantage, which with the use of glass consists in its transparency, is not to be regarded as of very great importance. Hence according to the present invention the above-mentioned advantage is waived and the front of the reflecting plates is silvered, so that glass need no longer be used and the same thermal conductivity may be obtained for the reflecting plates on the one hand and the intermediate member on the other by the employment of another material, which does not possess the defects inherent in glass. The material in question may according to the present invention be any of those metals, the hardness of which, as *e. g.* that of steel or of so called specular metal, is sufficiently great, to permit of the manufacture of adequately accurate reflecting surfaces. In consequence of the comparatively high value of the thermal conductivity of the metals in such optical squares a rapid equalization of differences in temperature is made possible. Besides these metals marble, granite and other such minerals as are capable of taking a polish are suitable materials. Bodies made of porcelain or baked clay, in which those parts of the surface that are to be silvered should be covered with a glazing, are particularly suitable both on account of their condition as regards strain and because of their very low coefficient of expansion. When the silvering is to be protected from chemical or mechanical attacks, either each reflecting surface may be covered with a transparent layer of varnish or a glass plate or else the whole optical square may be formed as a closed box provided with openings for the entrance and emergence of the light and the said openings closed by means of glass plates.

In the annexed drawing five examples of optical squares according to the invention are shown in perspective. All five squares deflect by 90°, the angle between the reflecting sides being 45° in Figures 1 to 4 and 135° in Fig. 5.

Figure 3:
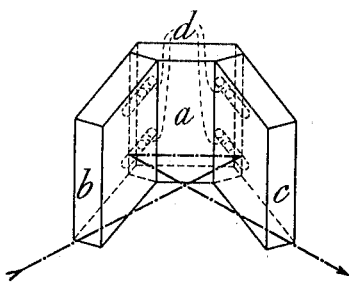
Figure 4:
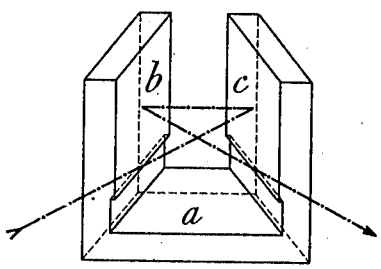
Figure 5:
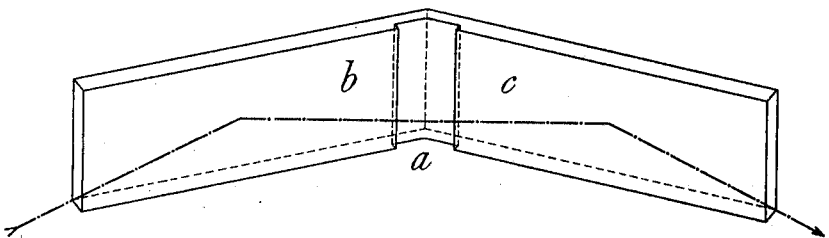

In the optical square, Fig. 1, the intermediate member *a* is a steel casing with three openings, the front one of which serves for the entrance and emergence of the light, while the two lateral ones are closed by silvered steel plates *b* and *c*, which are cemented in position. If the lower part of the hollow space of the optical square be rounded off, so as to correspond to a cylinder of rays, the broken axis of which is shown, and at the same time the top wall be omitted, there results the optical square according to Fig. 2, which may, *e. g.*, consist of specular metal. The example Fig. 3 shows the optical square open at the bottom as well. The intermediate member consists only of a back cross-piece of marble. This piece is connected to the plates $b$ and $c$, which are marble plates silvered on their front sides, by means of pins $d$. In the example according to Fig. 4 granite is assumed to be the material, of which the intermediate member $a$ and the plates $b$ and $c$ are made, which plate are integral with the intermediate member and are silvered on their front sides. The optical square according to Fig. 5 is assumed to be of porcelain or baked clay. The intermediate member and the plates are again integral. The plates are glazed on their front sides and then silvered.

I claim:

1. Optical square consisting of two reflecting plates and an intermediate member, all three of the same material, the plates being fixed to the intermediate member and silvered on their front sides.

2. Optical square consisting of two reflecting plates and an intermediate member, all three of metal, the plates being fixed to the intermediate member and silvered on their front sides.

OTTO EPPENSTEIN.

Witnesses:
 PAUL KRÜGER,
 FRITZ SANDER.

---

Copies of this patent may be obtained for five cents each, by addressing the "Commissioner of Patents, Washington, D. C."